(12) United States Patent
Baker et al.

(10) Patent No.: US 7,668,769 B2
(45) Date of Patent: Feb. 23, 2010

(54) SYSTEM AND METHOD OF DETECTING FRAUD

(75) Inventors: James C. Baker, Bremerton, WA (US);
Jacob Spoelstra, Carlsbad, CA (US);
Yuansong Liao, San Diego, CA (US)

(73) Assignee: Basepoint Analytics, LLC, Carlsbad, CA (US)

( * ) Notice: Subject to any disclaimer, the term of this patent is extended or adjusted under 35 U.S.C. 154(b) by 73 days.

(21) Appl. No.: 11/543,271

(22) Filed: Oct. 3, 2006

(65) Prior Publication Data

US 2007/0106582 A1 May 10, 2007

Related U.S. Application Data

(60) Provisional application No. 60/723,405, filed on Oct. 4, 2005.

(51) Int. Cl.
*G06Q 30/00* (2006.01)
(52) U.S. Cl. .............................. 705/35; 705/38; 705/39; 705/42; 705/44
(58) Field of Classification Search ............. 705/35–44; 700/90; 704/231
See application file for complete search history.

(56) References Cited

U.S. PATENT DOCUMENTS

| | | | | |
|---|---|---|---|---|
| 5,819,226 | A * | 10/1998 | Gopinathan et al. | 705/44 |
| 6,134,532 | A * | 10/2000 | Lazarus et al. | 705/14 |
| 6,330,546 | B1 * | 12/2001 | Gopinathan et al. | 705/35 |
| 6,430,539 | B1 * | 8/2002 | Lazarus et al. | 705/10 |
| 6,728,695 | B1 * | 4/2004 | Pathria et al. | 707/2 |
| 6,839,682 | B1 * | 1/2005 | Blume et al. | 705/10 |
| 7,165,037 | B2 * | 1/2007 | Lazarus et al. | 705/10 |
| 2002/0133371 | A1 | 9/2002 | Cole | |
| 2002/0133721 | A1 * | 9/2002 | Adjaoute | 713/201 |
| 2002/0194119 | A1 * | 12/2002 | Wright et al. | 705/38 |

(Continued)

FOREIGN PATENT DOCUMENTS

CA 1252566 4/1989

(Continued)

OTHER PUBLICATIONS

"Fraud Detection in the Financial Industry", A SAS Institute Best Practices Paper, 32 pages.

(Continued)

*Primary Examiner*—James P Trammell
*Assistant Examiner*—Hai Tran
(74) *Attorney, Agent, or Firm*—Knobbe, Martens, Olson & Bear LLP

(57) ABSTRACT

Embodiments include systems and methods of detecting fraud. In particular, one embodiment includes a system and method of detecting fraud in transaction data such as payment card transaction data. For example, one embodiment includes a computerized method of detecting that comprises receiving data associated with a financial transaction and at least one transacting entity, wherein the data associated with the transacting entity comprises at least a portion of each of a plurality of historical transactions of the transacting entity, applying the data to at least one first model, generating a score based on the first model, and generating data indicative of fraud based at least partly on the score. Other embodiments include systems and methods of generating models for use in fraud detection systems.

45 Claims, 7 Drawing Sheets

U.S. PATENT DOCUMENTS

| | | | |
|---|---|---|---|
| 2003/0093366 A1 | 5/2003 | Halper et al. | |
| 2005/0108025 A1* | 5/2005 | Cagan | 705/1 |
| 2005/0276401 A1* | 12/2005 | Madill et al. | 379/114.14 |

FOREIGN PATENT DOCUMENTS

| | | |
|---|---|---|
| CA | 2032126 | 8/1993 |
| CA | 2052033 | 1/1999 |
| EP | 1450321 A | 8/2004 |
| WO | WO/0177959 | 10/2001 |
| WO | WO/02/097563 A2 | 12/2002 |

OTHER PUBLICATIONS

Garavaglia, Susan, "An Application of a Counter-Propagation Neural Network: Simulating the Standard & Poor's Corporate Bond Rating System", IEEE 1991, pp. 278-287.

Congressional Testimony of Chris Swecker, Assistant Director, Criminal Investigative Division, Federal Bureau of Investigation, before the House Financial Services Subcommittee on Housing and Community Opportunity, Oct. 7, 2004, 5 pages.

"New Business Uses for Neurocomputing", I/S Analyzer, Feb. 1990, vol. 28, No. 2, 15 pages.

Ghosh, Sushmito and Reilly, Douglas L., "Credit Card Fraud Detection with a Neural-Network", IEEE 1994, pp. 621-630.

Neal, Mark, Hunt, John and Timmis, Jon, "Augmenting an Artificial Immune Network", IEEE 1998, pp. 3821-3826.

Klimasauskas, Casimir C., "Neural Networks: A Short Course", PC AI, Nov./Dec. 1988, pp. 26-30.

Klimasauskas, Casimir C., "Applying Neural Networks Part 1: An Overview of the Series", PC AI, Jan. Feb. 1991, pp. 30-33.

Klimasauskas, Casimir C., "Applying Neural Networks Part 2: A Walk Through the Application Process", PC AI, Mar./Apr. 1991, pp. 27-34.

Klimasauskas, Casimir C., "Applying Neural Networks Part III: Training a Neural Network", PC AI, May/Jun. 1991, pp. 20-24.

Klimasauskas, Casimir C., "Applying Neural Networks Part IV: Improving Performance", PC AI Jul./Aug. 1991, pp. 34-41.

Klimasauskas, Casimir C., "Applying Neural Networks Part V: Integrating a Trained Network into an Application", PC AI Sep./Oct. 1991, pp. 36-41.

Klimasauskas, Casimir C., "Applying Neural Networks Part VI: Special Topics", PC AI Nov./Dec. 1991, pp. 46-49.

J. Killin. "Combatting credit card fraud with knowledge based systems." In Compsec 90 International. Elsevier Advanced Technology, Oxford, Oct. 1990.

International Search Report for PCT Application No. PCT/US2006/039132, dated Feb. 13, 2007, 13 pages.

* cited by examiner

SYSTEM AND METHOD OF DETECTING FRAUD

RELATED APPLICATIONS

This application claims the benefit of, and incorporates by reference in its entirety, U.S. provisional patent application no. 60/723,405, filed Oct. 4, 2005.

BACKGROUND OF THE INVENTION

1. Field of the Invention

The present invention relates to detecting fraud in financial transactions.

2. Description of the Related Technology

Fraud detection systems detect fraud in financial transactions. For example, a payment card transaction fraud detection system may be configured to analyze transaction data to identify transactions that are fraudulent.

Existing payment card fraud detection systems may use transaction data in addition to data related to the transacting entities to identify fraud. Such systems may operate in either batch (processing transactions as a group of files at periodic times during the day) or real time mode (processing transactions one at a time, as they enter the system). However, the fraud detection capabilities of existing systems have not kept pace with either the types of payment card fraudulent activity that have evolved or increasing processing and storage capabilities of computing systems.

Financial transactions and payment card transaction data may refer to transactions, authorization of transactions, external data and other activities such as non-monetary transactions, payments, postings or a voice response unit (VRU) events. Moreover, payment card transaction data may include data derived from transactions using a physical payment card, e.g., with a magnetic stripe, and electronic transactions in which payment card data is used without the payment card being physically read or presented. Financial transactions can include credit or debit based transactions associated with, for example, a point of sale (POS) terminal or an automated teller machine (ATM). These transactions are often aggregated into databases from which an analysis can be performed for fraud.

However, existing fraud detection systems have failed to keep pace with the dynamic nature of financial transactions and payment card fraud. Moreover, such systems have failed to take advantage of the increased capabilities of computer systems. Thus, a need exists for improved systems and methods of detecting payment card fraud.

SUMMARY OF CERTAIN INVENTIVE ASPECTS

The system, method, and devices of the invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "Detailed Description of Certain Embodiments" one will understand how the features of this invention provide advantages that include improved and more accurate payment card fraud detection.

One embodiment includes a computerized method of detecting fraud. The method includes receiving data associated with a financial transaction and at least one transacting entity. The data associated with the transacting entity comprises at least a portion of each of a plurality of historical transactions of the transacting entity. The method further includes applying the data to at least one first model. The method further includes generating a score based on the first model. The method further includes generating data indicative of fraud based at least partly on the score.

One embodiment includes a system for detecting fraud. The system includes a storage configured to receive data associated with at least one transacting entity. The data associated with the transacting entity comprises at least a portion of each of a plurality of historical transactions of the transacting entity. The system further includes a processor configured to apply transaction data and the data associated with the at least one transacting entity to at least one first model, generate a score based on the first model, and generate data indicative of fraud based at least partly on the score.

One embodiment includes a system for detecting fraud. The system includes means for receiving data associated with at least one transacting entity. The data associated with the transacting entity comprises at least a portion of each of a plurality of historical transactions of the transacting entity. The system further includes means for processing transaction data. The processing means is configured to apply transaction data and the data associated with the at least one transacting entity to at least one first model, generate a score based on the first model, and generate data indicative of fraud based at least partly on the score.

DETAILED DESCRIPTION OF CERTAIN EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

For example, it has been found that, as discussed below with reference to certain embodiments, payment card fraud detection can be improved by using stored past transaction data in place of, or in addition to, summarized forms of past transaction data. In addition, in one embodiment, payment card fraud detection is improved by using statistical information that is stored according to groups of individuals that form clusters. In one such embodiment, fraud is identified with reference to deviation from identified clusters. In one embodiment, in addition to data associated with the direct parties to a transaction (e.g., a credit or debit card user and a merchant), embodiments of fraud detection systems may use data that is stored in association with one or more entities associated with the processing of the transaction such as a point of sale terminal, or an automated teller machine (ATM). The entities may be real persons, particular instances of processing equipment, a particular merchant, or a chain or brand associated with the merchant. Fraud generally refers to any material misrepresentation associated with a transaction (or authorization of the transaction). For example, fraud may refer to misrepresentations associated with the identity of the parties, misrepresentations associated with the authenticity or validity of a credit or debit card, misrepresentations associated with obtaining credit used in the transaction or misrepresentations regarding a purchaser's ability or likelihood of payment. In addition to data associated with transactions and the entities, various patterns may be detected from external sources, such as data available from a credit bureau or other data aggregator.

Figure 1:
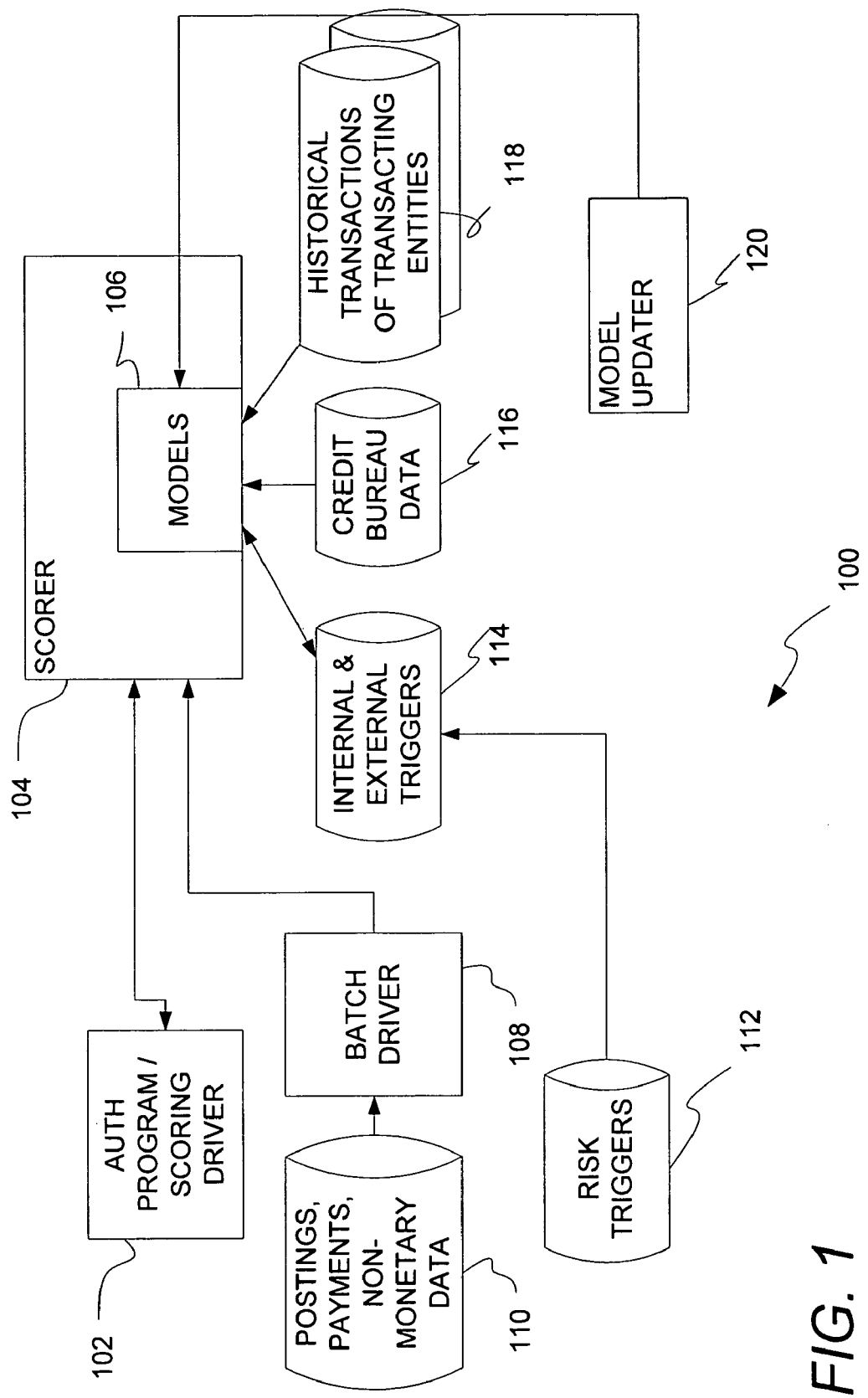
FIG. 1 is a functional block diagram illustrating a fraud detection system such as for use with a payment card transaction processing or authorization system.

FIG. 1 is a functional block diagram illustrating a fraud detection system 100. The fraud detection system 100 may be configured to detect fraud in a "real time" mode, e.g., prior to, or as part of, the authorization process for the transaction. In one embodiment, authorization of the transaction is based on data indicative of fraud provided by the fraud detection system 100. Alternatively, or in addition, the fraud detection system 100 may be configured to detect fraud in a batch mode, e.g., after the transaction has been completed. The data indicative of fraud generated by the system 100 may be used as part of the authorization process of subsequent transactions by the entities or account, to associate an indicator of fraud with one or more of the entities or an account associated with the transaction. The indicator of fraud may indicate that the entity or account is in a state indicative of fraud that can be used to indicate the need to take one or more actions such as contacting the entity, lock the account, point of sale terminal, or ATM associated with the transaction, or take any other suitable action.

The system 100 includes an authorization/scoring driver 102 that provides transaction data for processing by a scorer 104 such as during authorization of the corresponding transaction. In one embodiment, the transaction data is payment card transaction data. The scorer 104 applies the transaction data to one or more models 106 to generate data indicative of fraud associated with the transaction data. A batch driver 108 may also provide transaction data in a batch mode for processing by the scorer 104. The batch driver 108 may also receive other transaction related data such as postings, payments, and non-monetary data from one or more databases 110 and provide that data to the scorer 104 for scoring of the associated entity or account, and/or for use in scoring transaction data.

In one embodiment, a risk triggers module 112 provides triggers to a triggers database 114 of the system 100. Triggers may include relationships (e.g., a recent payment is more than the balance due) or rules that have been identified as being indicative of fraud. In one embodiment, a third party or card issuer periodically provides triggers to the triggers database 114. One or more models 106 of the scorer 104 may generate data indicative of fraud based on the triggers from the triggers database 114. A credit bureau data module 116 receives data from one or more credit bureaus and provides that data to the scorer 104.

In one embodiment, one or more of the models 106 provides the data indicative of fraud based on historical transactions of one or more transacting entities. The historical transactions associated with entities may include transaction records and integrated trend summaries (TRAITS). In one embodiment, a database 118 is configured to maintain the historical transactions of one or more transacting entities, including TRAITS data and provide that data to the scorer 104.

One embodiment includes a model updater 120 that generates new or updated models 106 and provides those models 106 to the scorer 104. The model updater 120 may be configured to update one or more of the models 106 periodically, e.g., nightly or weekly. The model updater 120 may also update one or more of the models 106 to provide the system 100 with new models 106 as part of new system or software version deployments.

Figure 2:
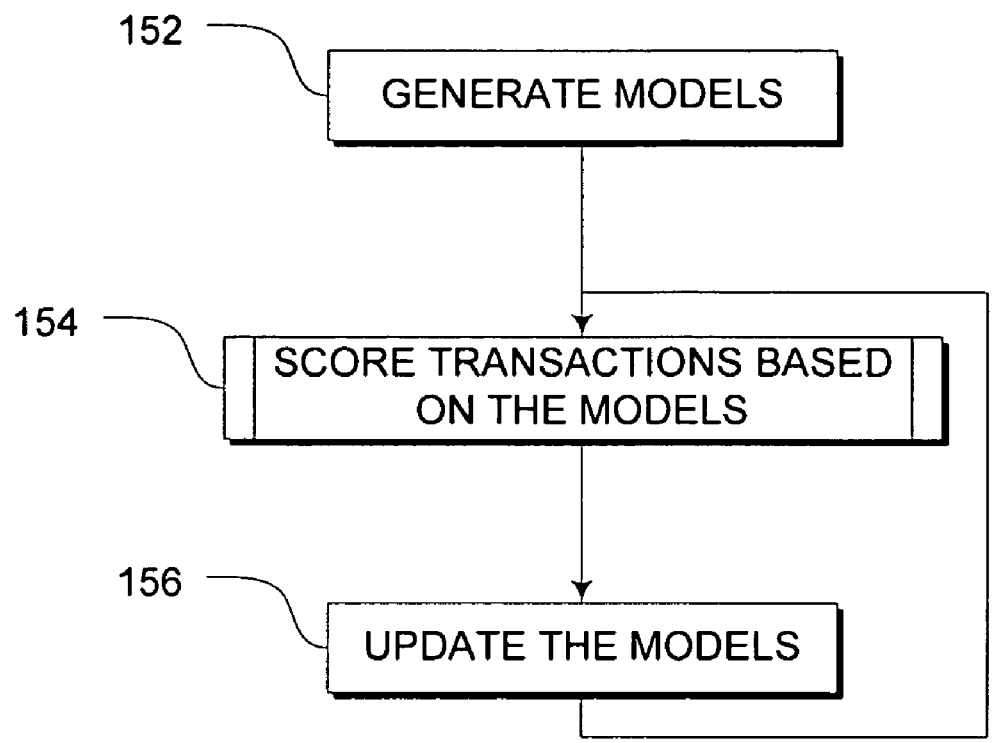
FIG. 2 is a high level flowchart illustrating an example method of model generation and use according to one embodiment of the payment card fraud detection system of FIG. 1.

FIG. 2 is a high level flowchart illustrating an example method 150 of model generation and use according to one embodiment of the fraud detection system 100. The method 150 begins at a block 152 in which the models 106 are generated. In one embodiment, the models 106 include supervised models that are generated based on training or data analysis that is based on historical transactions or applications that have been identified as fraudulent or non-fraudulent. The models 106 may include other types of learning based models including, for example, unsupervised learning models such as clustering (e.g., K-means or Mahalanobis distance based models), anomaly (or outlier) detection (e.g., principal components or compression neural networks), competitive Learning (e.g., Kohonen self-organizing maps) and one-class support vector machine (SVM). Moving to a block 154, the system 100 applies transaction data to models 106. The functions of block 154 may be repeated for each transaction, approval, or other unit of data that is to be processed. Further detail of applying data to the models is described with reference to FIG. 4. Proceeding to a block 156, the model updater 120 updates models and related data at intervals that may vary depending upon the particular model 106. For example, in one embodiment, TRAITS data in the database 118 may be updated in real time as new data arrives, while clustering based models are updated periodically, e.g., daily. Certain models may be updated manually or when new versions of software of the system 100 are released.

Figure 3:
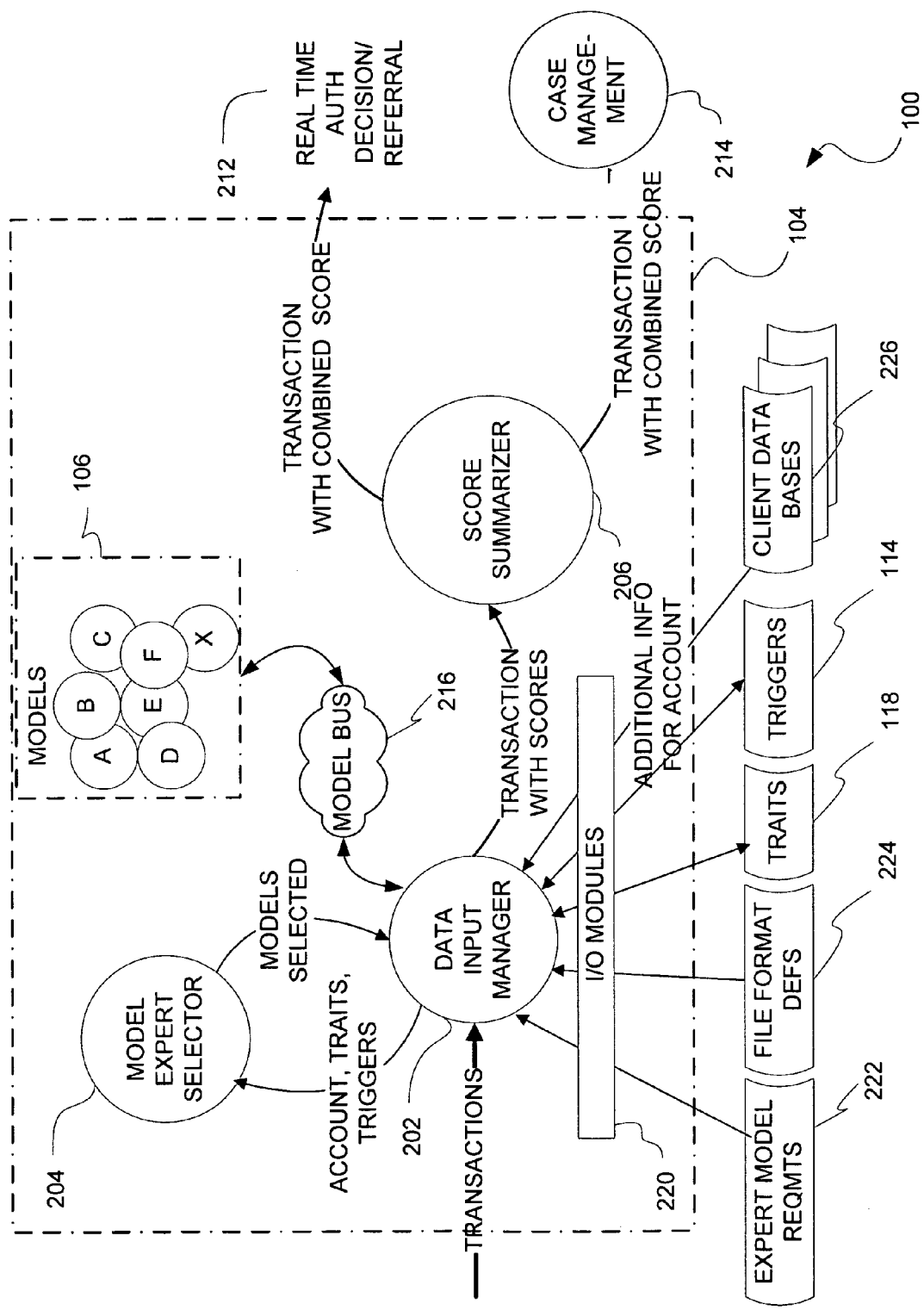
FIG. 3 is a functional block diagram illustrating in further detail portions of the payment card fraud detection system of FIG. 1.

FIG. 3 is a functional block diagram illustrating in further detail portions of the scorer 104, including data flow between certain portions of the system 100. The scorer 104 includes a data input manager 202 that receives transactions and data from various databases and applies that data to the models 106, a model expert selector 204 that selects one or more of the models 106 to which transaction data is applied to generate data indicative of fraud, and a score summarizer 206 that receives data indicative of fraud, including scores, from one or more models and generates a combined data or score to associate with the transaction data. The scorer 104 may provide the score(s) to a real time authorization/decision referral module 212 that may be part of the system 100 or external to the system 100. Depending on the mode of operation, e.g., real time or batch operation, the scorer 104 may provide the score or other data indicative of fraud to a case management module 214 that manages a card issuer or other party's actions in response to the data indicative of fraud.

The data input manager 202 may interface with a variety of data sources to provide data for use by the models 106 via an I/O interface modules 220. In order to make the entire system 100 as platform and site independent as possible I/O calls may be performed through site-specific I/O modules 220 without customizing other system components. For example, in addition to credit bureau data 116 (shown on FIG. 1), the data input manager 202 may interface with expert model requirements data 222, file format definitions 224, historical transactions (e.g., TRAITS) data 118, triggers 114, and one or more client databases 226 that provides account and other entity related data. It is to be recognized that the client databases 226 may be external to the system 100. The operation of the data input manager 202 may be data driven. For example, the data input manager 202 may select data to provide to particular models 106 based on data from the expert model requirements database 222.

The data input manager 202 may also be configured to access new or additional databases such as the client databases 226 based on file format definitions 224. Each file format record has a first field that defines the format of the record (e.g., A101 for an authorization record, N101 for a nonmonetary record, P101 for a payment record, and so forth). When new fields or record types are added, the new format template with a new ID is added to the format database 224.

In one embodiment, the scorer 104 may include a model bus 216 that provides a configurable component interface to the models 106 that allows new models to be inserted or removed from the system independently (of the other models 106). Desirably, the system 100 is easily modified to account for new types of fraud, additional models to better identify fraud, and models configured to identify fraud in particular types of transactions or contexts. Moreover, new models 106 can be added and old models replaced without need to retrain or update existing models 106. For example, if debit cards or business cards processing is added to a particular embodiment of the system 100, models 106 can be trained on these types of cards, rather than having to rebuild and retrain the entire system 100 as might be the case if a single large monolithic model was used. In one embodiment, the models 106 include one or more specialized models 106 that are directed to specific types of transactions or specific fraud patterns (e.g., foreign transactions, ATM transactions, fraud type specialists) to improve overall fraud detection performance. The models may also include "local expert" models that focus on particular risk factors such as high amounts or foreign transactions, particular fraud patterns such as application fraud, or one or more triggers such as a payment being larger than the balance due.

Such component models 106 can be more compact, efficient, and focused, with, e.g. around 40 input values each, than large, monolithic models with hundreds of inputs. Desirably, use of a set of the models 106 has been found to reduce the amount of calculations needed to process a data set by comparison with typical large monolithic models configured to perform similar scoring. Such reduction in calculations by the models 106 tends to improve system throughput and reduce system latency.

The use of transaction records and integrated trend summaries (TRAITS) data 118 that includes at least a portion of the data associated with one or more transactions desirably has been found to provide better predictive performance than merely using summarized or averaged data. In one embodiment, TRAITS data for an entity or account comprises one or more fields from the actual transaction history for the entity or account into a data record for that entity or account. In one embodiment, the data record is a single record in order to minimize database access and fetch time. Such TRAITS data records better encapsulate fine detail (e.g., the last 50 merchant category codes (MCCs) used by the cardholder) and allow actual time series data to be analyzed by the models 106. For example, a particular model 106 may use link analysis as part of its score generation.

In one embodiment, models 106 may include cardholder clusters (generated, for example, using an unsupervised or clustering based algorithm) based on the corresponding TRAITS in order to capture spending habits by category and spending behavior within a cluster. Particular models 106 may identify transition of an account from cluster to cluster and take into account expected divergences from normal behavior due to life events (see table below). As illustrated in Table 1 below, TRAITS can help the models 106 identify how customers move from one "activity state" to another. The models 106 may generate scores based on whether the particular transitions are indicative of fraudulent account behavior.

TABLE 1

Example of TRAITS changing from one cluster to another

| Move From | To |
|---|---|
| Domestic Spender | Foreign Spender |
| Dormant | Active |
| Non-Holiday | Holiday |
| Non-Traveler | Traveler |
| Threw Card Away | Reissue (cardholder begins using card again) |
| Stable Residence | Just Moved |

TRAITS can also be based on transaction history for entities such as Automated Teller Machines (ATMs), Point of Sale devices (POS), Merchants, Issuer Portfolio, Issuer BIN, and MCC code levels.

Supervised or unsupervised models 106 can be generated (e.g., trained) based on entity traits. The unsupervised models 106 can be trained to spot new and emerging fraud trends that are not in the training data. Unsupervised models can also identify divergences from legitimate behavior and classify them into more or less risky clusters. This allows the models 106 to maintain a high level of adaptability to changing conditions without the need for frequent retraining.

In one embodiment, at least a portion of the models 106 may be configured to define a "committee" or "panels of experts." A committee comprises a group of the models 106 that are optimized in terms of input variables and TRAITS for a particular type of fraud detection, particular type of transaction, particular type of entity or entity state, or suitable for processing any other particular data configurations. In one embodiment, each model 106 is configured to identify its area of expertise in terms of transaction or entity data to allow the model expert selector 204 to select the particular model 106 when suitable transaction data is being processed. By providing such configuration data, the system 100 can be configured more easily, with less configuration management, etc. to include new or different models 106 over time or in a particular instance of the system 100.

For example, the models 106 may comprise models 106 configured to process foreign transactions, jewelry purchases, and or young accounts ("thin files"). Thus, a young account (thin file) transacting at a jewelry store outside the United States may employ all three of these example models 106 to score the transaction. Each model 106 may provide a score and confidence level to the score summarizer 206 to be combined to generate a combined score and appropriate risk indicators.

Models 106 may be based on any suitable modeling technique including, for example, neural networks, cascades (which may significantly improve performance for real-time referrals if trained on fraud transaction tags (identifying training transactions as fraudulent) rather than fraud account tags (identifying accounts as being used fraudulently)), support vector machines (SVM), genetic algorithms (GA), fuzzy logic, fraud case-based reasoning, decision trees, naïve Bayesian, logistic regression, and scorecards.

The models 106 may be supervised (i.e., with fraud tagging of the training data) or unsupervised (i.e., without fraud tags). In one embodiment, unsupervised models are used for models 106 that use as input data such as TRAITS built on portfolios of accounts, Bank Identification Number (BIN)—a unique series of numbers assigned by Visa/MasterCard to member institutions that identifies each institution in transaction processing, and merchant category codes (MCC). The unsupervised models 106 can help identify new fraud trends by identifying accounts and their TRAITS that are diverging from legitimate behavior, but that do not diverge in a way previously identified The unsupervised models 106 may be based on one or more of clustering (e.g., K-means or Mahalanobis distance based models), anomaly (or outlier) detection (e.g., principal components or compression neural networks), competitive learning (e.g., Kohonen self-organizing maps) and one-class support vector machine (SVM).

When such expert models 106 are small and have fewer inputs than typical monolithic models, they can be refreshed or retrained much more efficiently. If it is desirable to retrain a particular expert model 106, such retraining can be performed without retraining the entire set of models.

Desirably, the use of smaller expert models 106 via the model bus 216 allows various models 106 to be easily retrained or updated on different cycles. For example, it has been found that a typical fraud detection model is desirably retrained on a 12-18 month interval. Performance tends to decay somewhat over the time the model package is deployed. By retraining only a subset of the expert models 106 at different time points (e.g., a staggered retrain), the model 106 can be kept more up to date. For example, after the initial deployment of the models 106, half of the expert's models may be retrained at the 6 month point, the remaining half at the 12 month point, and the original half at the 18 month point again, and so forth. Thus, the models 106 can be retrained more frequently than typical single-retrain model packages where the entire model is monolithically retrained.

In one embodiment, the model updater 120 may segment the data into subsets to better model input data. For example, if subsets of a data set are identified with significantly distinct behavior, special models designed especially for these subsets normally outperform a general fit-all model. In one embodiment, a prior knowledge of data can be used to segment the data for generation or retraining of the models 106. For example, in one embodiment, data is segregated geographically so that, for example, regional differences do not confound fraud detection. In other embodiments, data driven techniques, e.g., unsupervised techniques such as clustering, are used to identify data segments that may benefit from a separate supervised model.

In one embodiment, the models 106 may output various types of data indicative of fraud to the score summarize 206. In addition to fraud scores in a particular range, e.g., 1-999, secondary scores may be generated to provide additional ways of detecting or quantifying risks such as first-party fraud, identity theft, application fraud, and merchant risk. Such scores for the models 106 may depend on the characteristics of the transaction, any triggers in place for the account, and TRAITS of entities associated with particular transaction data. One or more of the models may also generate a "bust-out" score (e.g., in the range of 1-999) indicative of a cardholder who maintains good credit for a time period then suddenly begins spending larger amounts (without paying). One or more of the models may also generate a "mass compromise" score (e.g., in the range of 1-999) indicative of a multi-account compromise. It has been found that the use of TRAITS for groups of accountholders or a portfolio of accounts desirably improves the detection of mass compromise events by the models 106. Model scores may also include a point-of-sale (POS) Action Score (Refer Score) (1-999), for example, for real time identification and referral to the vendor or issuer of accounts or transactions that appear to be fraudulent prior to approval. One or more of the models 106 may generate fraud application risk scores for new accounts and balance transfer and convenience check related scores. In addition, one or more of the models 106 may predict fraud types including identity fraud. One or more of the models 106 may also generate loss estimates to allow an issuer or other user of the system 100 to identify and focus on accounts with potential large losses. Treatment or authorization scores may be generated to provide data indicative of how to treat or whether to authorize a transaction. A chargeback status may be generated based on Issuer rules or on a success probability generated by the particular model 106. Scores may also be generated that are associated with various entities to the transaction such as the merchant, the transacting POS, or the transacting ATM.

One or more of the models 106 may also be configured to read in data files of account numbers (e.g., for mass compromises) and output various severity indicators to incorporate with the fraud score for special handling (e.g., identify cases for follow-up at lower scores, refer at lower scores, etc.)

The model expert selector 204 may select one or more of the models 106, e.g., a subset of the models 106, for evaluating a particular set of transaction data based on one or more of the triggers 114, the historical transaction and TRAITS database 118, data associated with the type or amount of the transaction, and the entities involved.

The score summarizer 206 assesses the confidence of each of the output of the selected models 106 and provides combined weight and treatment guidance, including a final score and risk indicators. The selected risk indicators may include explanations of potential types of frauds and recommendations for action. The score summarizer 106 may use a weighting to combine the scores of the selected models 106. In one embodiment, one or more of the models 106 provides weighting data. The score summarizer 106 combines the scores of each of the selected models 106 and provides a combined score along with data such as the risk indicators.

The models 106 and/or the score summarizer 206 may be configured to provide the Issuer with customized, automatic, and dynamic calibration to control referral levels and case creation volumes. Such dynamic calibration may be based on the actual in-production score distributions so as to eliminate ad hoc or arbitrary Christmas or other seasonal calibration. Such dynamic calibration conveniently provides the issuer with the ability to modify score distributions during times of emergencies or unusual events, such as natural disasters.

Figure 4:
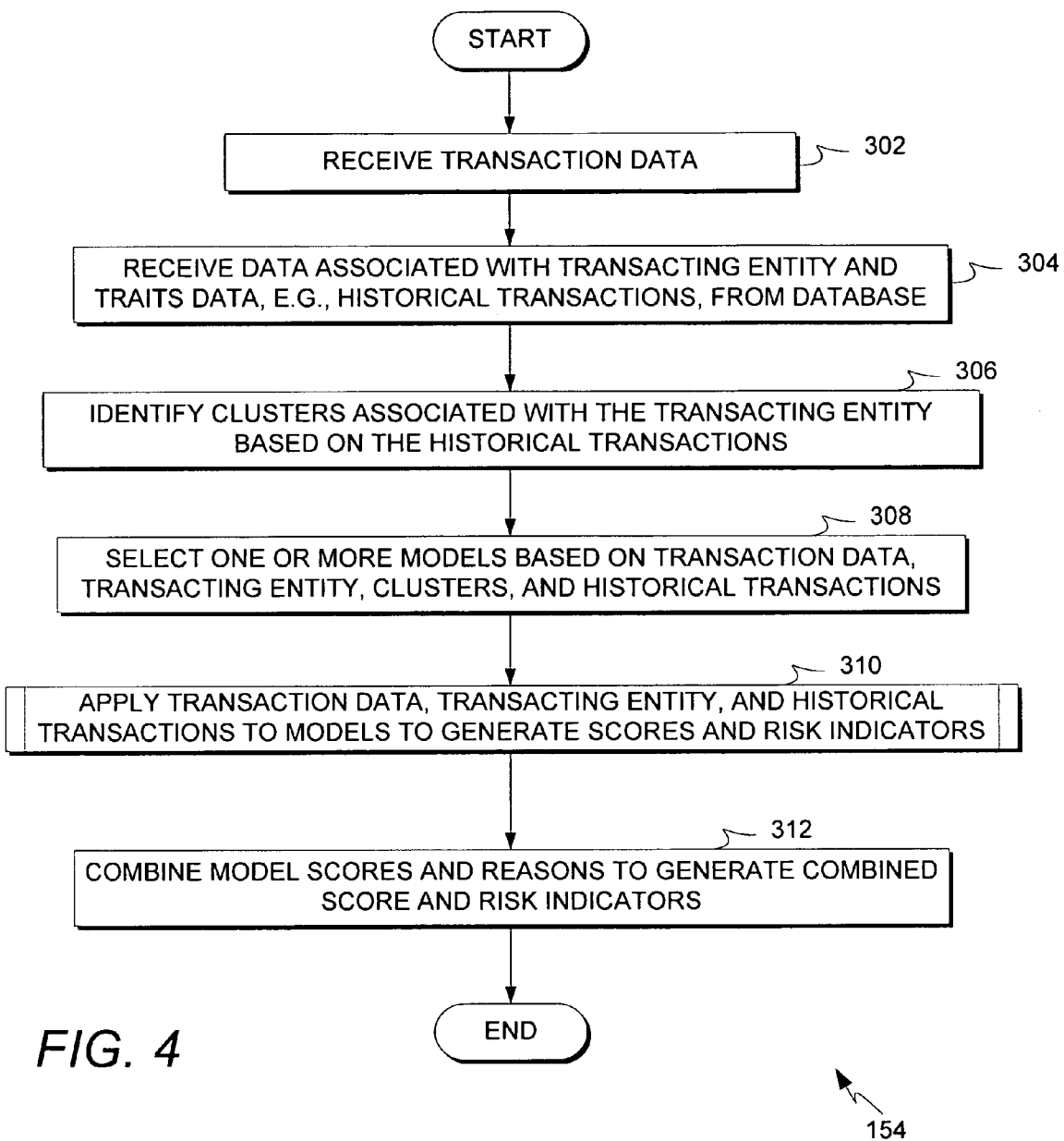
FIG. 4 is a flowchart illustrating an example of a method of processing transaction data according to one embodiment of the payment card fraud detection system of FIG. 1.

FIG. 4 is a flowchart illustrating an example of a method 154 of processing transaction data according to one embodiment of the fraud detection system 100. At a block 302, the data input manager 202 receives transaction data. Next at a block 304, the data input manager 202 receives, e.g., from I/O modules 220, data associated with transacting entity and TRAITS data, e.g., historical transactions, from one or more databases. Next at a block 306, the model expert selector 204 may identify clusters associated with the transacting entity based on the historical transactions. Proceeding to a block 308, the model expert selector 204 selects one or more of the models 106, e.g., based on transaction data, transacting entity, clusters, and historical transactions. Next at a block 310, the data input manager 202 applies transaction data, transacting entity, and historical transactions to the selected models 106 to generate scores and risk indicators. Moving to a block 312, the score summarizer 206 combines the model scores and reasons to generate a combined score and risk indicators. The system 100 may repeat the acts associated with the method 154 for multiple transactions, transactions authorizations, etc. in real time or in batch mode.

Figure 5:
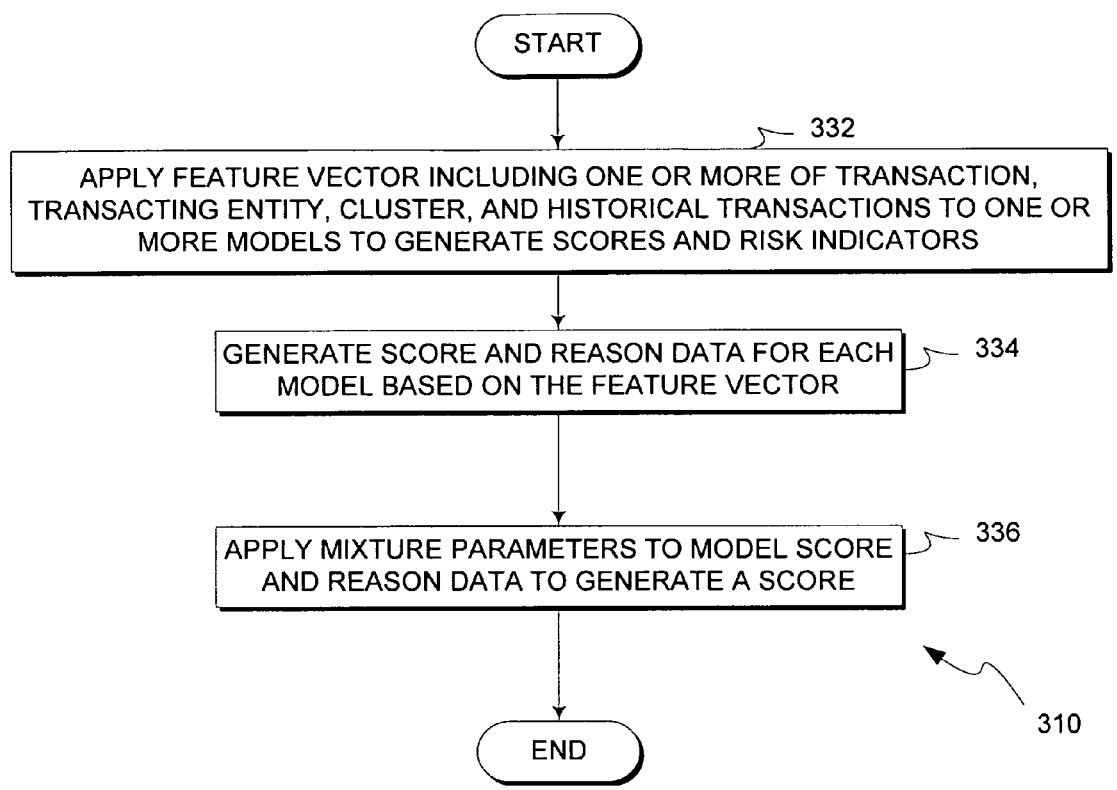
FIG. 5 is a flowchart illustrating in more detail one embodiment of a portion of the method illustrated in FIG. 4.

FIG. 5 is a flowchart illustrating in more detail an example of applying transaction data, transacting entity, and historical transactions to models to generate scores and risk indicators of the block 310 method 154. FIG. 5 illustrates an example of a committee scoring model for combining outputs of several models 106. At a block 332, the data input manager 202 (FIG. 3) applies a feature vector including one or more of transaction, transacting entity, cluster, and historical transactions to one or more models 106 to generate scores and risk indicators. Next at a block 334, the models 106 each generate score and reason data based on the feature vector. Moving to a block 336, the score summarizer 206 applies mixture parameters to the score and reason data to generate a committee score for the group of the models 106.

Figure 6:
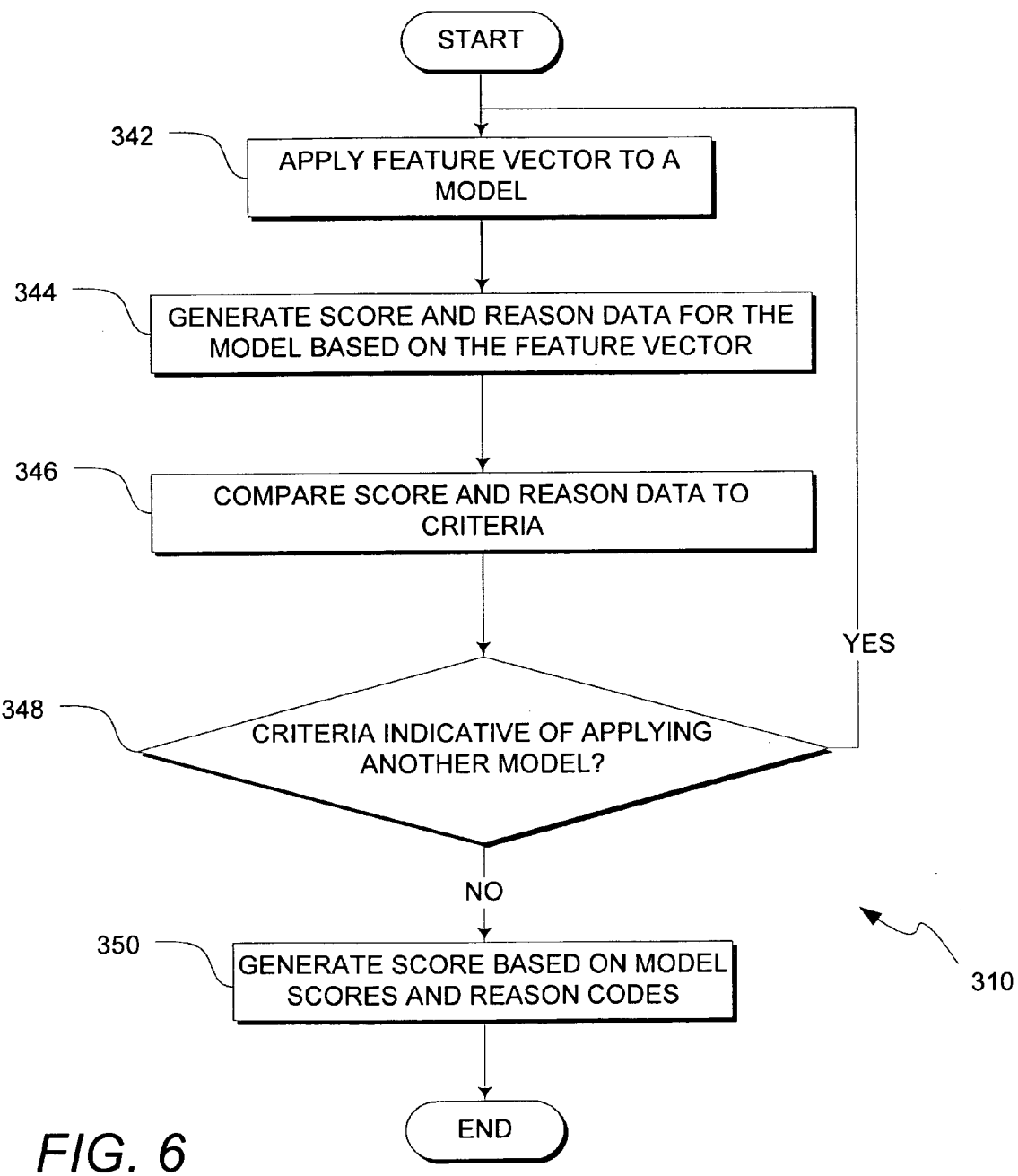
FIG. 6 is a flowchart illustrating in more detail one embodiment of a portion of the method illustrated in FIG. 4.

FIG. 6 is a flowchart illustrating in more detail another example of applying transaction data, transacting entity, and historical transactions to models to generate scores and risk indicators of the block 310 of the method 154. FIG. 6 illustrates an example of a scoring model in which two or more of the models 106 are used sequentially to generate score and risk indicator data. At a block 342, the data input manager 202 (FIG. 3) applies a feature vector including one or more of transaction, transacting entity, cluster, and historical transactions to one or more models 106 to generate scores and risk indicators. Next at a block 344, one of the models 106 generates score and reason data based on the feature vector. Moving to a block 346, the score summarizer 206 compares the score and reason data to one or more selected or predetermined criteria. Next at a decision block 348, if the comparison of the criteria with the score and reason data is indicative of applying an additional model, the method 310 proceeds back to the block 342 in which the feature vector (and/or additional or different data) are applied to another one of the models 106. Returning to the decision block 348, if the criteria are not indicative of applying another model, it proceeds to the block 350 in which the scoring summarizer 206 generates score and reason data based on the data obtained at the block 346.

In one embodiment, the committee score may be determined using one or more of the following models:

an equal weight average:

$$s_c = \frac{1}{N} \sum_{i=1}^{N} s^i,$$

where N is the number of scores;
a weighted average:

$$s_c = \sum_{i=1}^{N} s^i \alpha^i,$$

where N is the number of scores and $\alpha^i$ is estimated based on how predictive scores i is;
a competitive committee:

$$s_c = \frac{1}{M} \sum_{i=1}^{M} s^i,$$

where $s^i \in$ (set of largest M scores); and
a neural network-based committee score.

Figure 7:
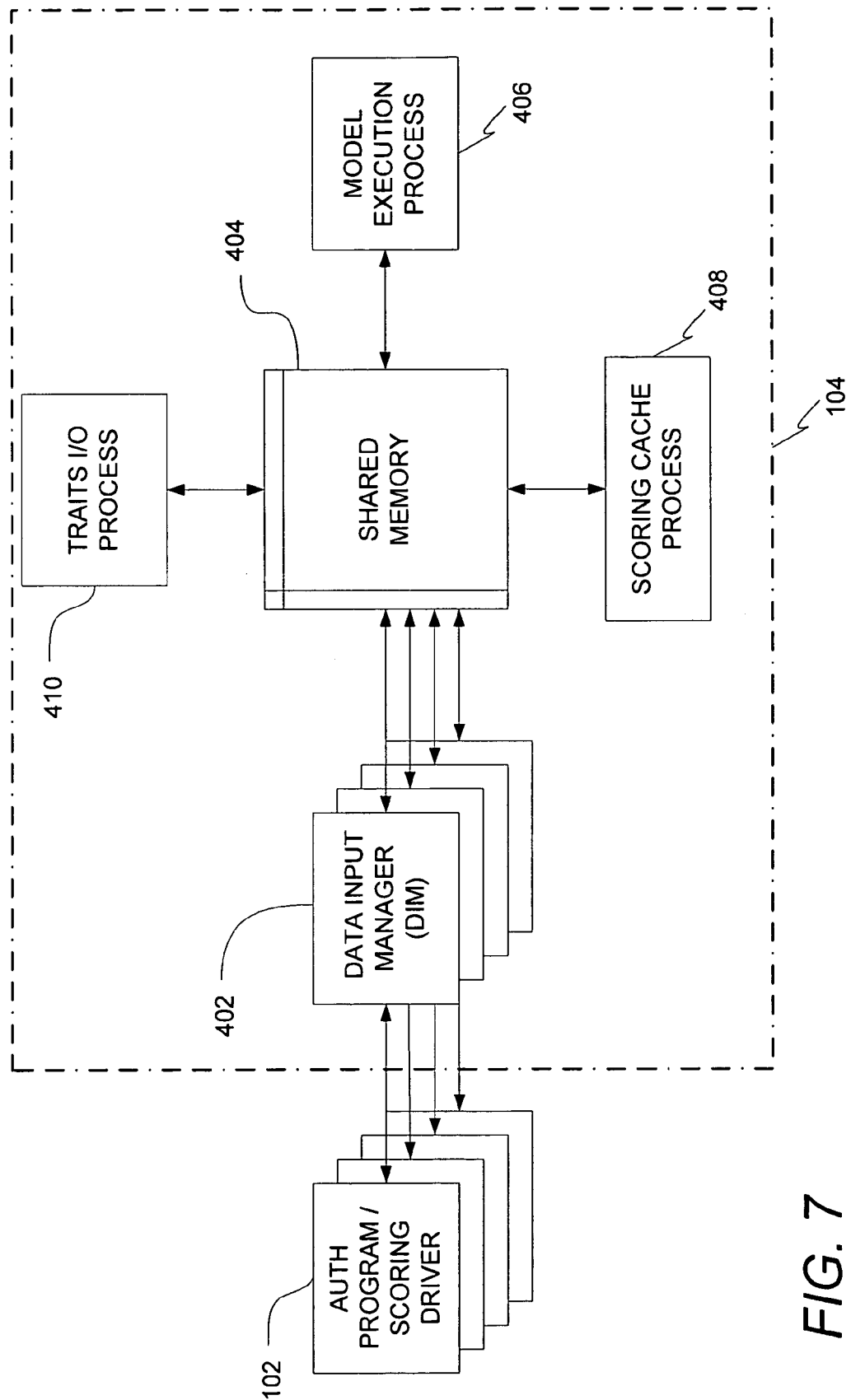
FIG. 7 is a functional block diagram illustrating portions of one embodiment of the payment card fraud detection system of FIG. 1.

FIG. 7 is a functional block diagram illustrating portions of one embodiment of the fraud detection system 100. In particular, FIG. 7 illustrates one embodiment of a process model for the system 100. The driver 102 comprises one or more processes or threads providing transaction data to the scorer 104. The scorer 104 includes one or more processes 402 for executing the data input manager 202 (FIG. 3). The data input manager processes 402 communicate via a shared memory 404 with one or more model execution processes 406 that execute the models 106, one or more scoring cache processes 408 configured to updating and maintaining transaction scores, and one or more TRAITS I/O processes configured to communicate with the TRAITS database 118. The processes 402, 406, 408, and 410 may be executed on one or more processors (not shown). In one embodiment, the processes 402, 406, 408, and 410 may be executed on one or more mainframe computer systems.

It is to be recognized that depending on the embodiment, certain acts or events of any of the methods described herein can be performed in a different sequence, may be added, merged, or left out all together (e.g., not all described acts or events are necessary for the practice of the method). Moreover, in certain embodiments, acts or events may be performed concurrently, e.g., through multi-threaded processing, interrupt processing, or multiple processors, rather than sequentially.

Those of skill will recognize that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

While the above detailed description has shown, described, and pointed out novel features of the invention as applied to various embodiments, it will be understood that various omissions, substitutions, and changes in the form and details of the device or process illustrated may be made by those skilled in the art without departing from the spirit of the invention. As will be recognized, the present invention may be embodied within a form that does not provide all of the features and benefits set forth herein, as some features may be used or practiced separately from others. The scope of the invention is indicated by the appended claims rather than by the foregoing description. All changes which come within the meaning and range of equivalency of the claims are to be embraced within their scope.

What is claimed is:

1. A computerized method of detecting fraud, the method comprising:
    receiving, on at least one processor, data associated with a financial transaction and at least one transacting entity, wherein the data associated with the transacting entity comprises respective values of at least one data field of each of a plurality of historical transactions of the transacting entity;
    applying the data to at least one first model;
    generating a score based on the first mode; and
    generating data indicative of fraud based at least partly on the score.

2. The method of claim 1, further comprising:
    authorizing the financial transaction based on the data indicative of fraud.

3. The method of claim 1, further comprising:
    associating an indicator of fraud with at least one of the transacting entity and an account associated with the transacting entity.

4. The method of claim 1, further comprising:
    identifying the transaction data for review based on in part on the indicator of fraud.

5. The method of claim 1, further comprising:
    selecting the at least one first model based on the at least a portion of each of the plurality of historical transactions.

6. The method of claim 5, further comprising:
    selecting at least a second model based on the data associated with the financial transaction.

7. The method of claim 1, wherein the at least one first model comprises a plurality of models.

8. The method of claim 7, wherein generating the data indicative of the fraud comprises combining outputs of the plurality of models using at least one of a committee or panel of experts.

9. The method of claim 7, wherein each of the plurality of models comprises an independent software module.

10. The method of claim 1, wherein the plurality of historical transactions comprise a time series.

11. The method of claim 1, wherein the at least one transacting entity comprises at least one of an account holder, a merchant, a point of sale terminal, or an automated teller machine.

12. The method of claim 1, wherein the at least one first model comprises at least one of: a neural network, a cascaded neural network, a support vector machine, a genetic algorithm, a fuzzy logic model, a case-based reasoning model, a decision tree, a naïve Bayesian model, a logistic regression model, and a scorecard model.

13. The method of claim 1, further comprising:
    applying at least one second model to the at least a portion of each of the plurality of historical transactions; and
    identifying a first cluster with the transacting entity based on the at least one second model.

14. The method of claim 13, further comprising:
    selecting the at least one first model based at least partly on data associated with the first data cluster.

15. The method of claim 14, wherein applying the data to the at least one first model comprises applying data indicative of historical transactions of at least one other transacting entity associated with the first cluster to the at least one model.

16. The method of claim 14, further comprising:
    identifying a second data cluster associated with the transacting entity based on the at least one second model, wherein generating data indicative of fraud is based at least partly on the second cluster.

17. The method of claim 16, further comprising:
    identifying a transition from the first cluster to the second cluster.

18. The method of claim 17, wherein generating data indicative of fraud is based at least partly on the identified transition.

19. The method of claim 16, wherein the at least one second model comprises at least one of: a neural network, a cascaded neural network, a support vector machine, a genetic algorithm, a fuzzy logic model, a case-based reasoning model, a decision tree, a naïve Bayesian model, a logistic regression model, and a scorecard model.

20. The method of claim 1, wherein generating data indicative of fraud is performed substantially in real time.

21. The method of claim 1, wherein generating data indicative of fraud is performed in a batch mode.

22. A system for detecting fraud, the system comprising:
    a storage configured to receive data associated with at least one transacting entity, wherein the data associated with the transacting entity comprises respective values of at least one data field of each of a plurality of historical transactions of the transacting entity; and
    a processor configured to:
        apply transaction data and the data associated with the at least one transacting entity to at least one first model;
        generate a score based on the first model; and
        generate data indicative of fraud based at least partly on the score.

23. The system of claim 22, wherein the processor is further configured to associate an indicator of fraud with at least one of the transacting entity and an account associated with the transacting entity.

24. The system of claim 22, wherein the processor is further configured to select the at least one first model based on the at least a portion of each of the plurality of historical transactions.

25. The system of claim 24, wherein the processor is further configured to select at least a second model based on the data associated with the financial transaction.

26. The system of claim 22, wherein the at least one first model comprises a plurality of models.

27. The system of claim 26, wherein the processor is configured to generate the data indicative of the fraud at least in part by combining outputs of the plurality of models using at least one of a committee or panel of experts.

28. The system of claim 26, wherein each of the plurality of models comprises an independent software module.

29. The system of claim 22, wherein the plurality of historical transactions comprise a time series.

30. The system of claim 22, wherein the at least one transacting entity comprises at least one of an account holder, a merchant, a point of sale terminal, or an automated teller machine.

31. The system of claim 22, wherein the at least one first model comprises at least one of: a neural network, a cascaded neural network, a support vector machine, a genetic algorithm, a fuzzy logic model, a case-based reasoning model, a decision tree, a naïve Bayesian model, a logistic regression model, and a scorecard model.

32. The system of claim 22, wherein the processor is further configured to:
apply at least one second model to the at least a portion of each of the plurality of historical transactions; and
identify a first cluster with the transacting entity based on the at least one second model.

33. The system of claim 32, wherein the processor is further configured to select the at least one first model based at least partly on data associated with the first data cluster.

34. The system of claim 33, wherein the processor is further configured to apply the data to the at least one first model at least in part by applying data indicative of historical transactions of at least one other transacting entity associated with the first cluster to the at least one model.

35. The system of claim 33, wherein the processor is further configured to identify a second data cluster associated with the transacting entity based on the at least one second model, wherein the processor is further configured to generate data indicative of fraud is based at least partly on the second cluster.

36. The system of claim 35, wherein the processor is further configured to identify a transition from the first cluster to the second cluster.

37. The system of claim 36, wherein the processor is further configured to generate the data indicative of fraud based at least partly on the identified transition.

38. The system of claim 35, wherein the at least one second model comprises at least one of: a neural network, a cascaded neural network, a support vector machine, a genetic algorithm, a fuzzy logic model, a case-based reasoning model, a decision tree, a naïve Bayesian model, a logistic regression model, and a scorecard model.

39. A system for detecting fraud, the system comprising:
means for receiving data associated with at least one transacting entity, wherein the data associated with the transacting entity comprises respective values of at least one data field of each of a plurality of historical transactions of the transacting entity; and
means for processing transaction data, said processing means configured to:
apply transaction data and the data associated with the at least one transacting entity to at least one first model;
generate a score based on the first model; and
generate data indicative of fraud based at least partly on the score.

40. A computerized method of detecting fraud, the method comprising:
receiving, on a processor, data associated with a financial transaction and at least one account, wherein the data associated with the account comprises respective values of at least one data field of each of a plurality of historical transactions of the account;
applying the received data to at least one first model;
generating a score based on the first model;
applying the received data to at least one second model;
identifying the account as being associated with a plurality of clusters,
wherein each of the clusters is identified as being associated with a plurality of accounts based on the application of the received data to the at least one second model and the received data and
wherein the at least one cluster is based at least in part on respective data values of the at least one data field of each of the plurality of historical transactions associated with each of the plurality of historical transactions of each of the plurality of accounts;
identifying a transition associated with the account between at least two of the clusters; and
generating data indicative of fraud based at least partly on the score and at least partly on the identified transition.

41. The method of claim 1, wherein the transacting entity is an account, wherein the method further comprises:
applying the received data to at least one second model;
identifying the transacting entity as being associated with a plurality of clusters, wherein each of the clusters associates with a plurality of accounts based on the application of the received data to the at least one second model and the received data;
identifying a transition associated with the transacting entity between at least two of the clusters; and
generating data indicative of fraud based at least partly on the score and at least partly on the identified transition.

42. The system of claim 22, wherein the transacting entity is an account, wherein the processor is further configured to:
apply the received data to at least one second model;
identify the transacting entity as being associated with a plurality of clusters, wherein each of the clusters associates with a plurality of accounts based on the application of the received data to the at least one second model and the received data;
identify a transition associated with the transacting entity between at least two of the clusters; and
generate data indicative of fraud based at least partly on the score and at least partly on the identified transition.

43. The system of claim 39, wherein the transacting entity is an account, wherein the processing means is further configured to:
apply the received data to at least one second model;
identify the transacting entity as being associated with a plurality of clusters, wherein each of the clusters associates with a plurality of accounts based on the application of the received data to the at least one second model and the received data;
identify a transition associated with the transacting entity between at least two of the clusters; and
generate data indicative of fraud based at least partly on the score and at least partly on the identified transition.

44. The method of claim 40, wherein the plurality of historical transactions of the account comprise a time series.

45. The method of claim 40, wherein the at least one transacting entity comprises at least one of an account holder, a merchant, a point of sale terminal, or an automated teller machine.

* * * * *